United States Patent [19]

Paranjpe et al.

[11] 4,146,899

[45] Mar. 27, 1979

[54] FORMED ORIFICE PLATE FOR INK JET PRINTING APPARATUS

[75] Inventors: Suresh C. Paranjpe; Elias Spyrou, both of Xenia, Ohio

[73] Assignee: The Mead Corporation, Dayton, Ohio

[21] Appl. No.: 841,741

[22] Filed: Oct. 13, 1977

[51] Int. Cl.² .......... G01D 15/18

[52] U.S. Cl. .......... 346/75; 346/140 R

[58] Field of Search .......... 346/75, 140 R

[56] References Cited

U.S. PATENT DOCUMENTS

| | | | |
|---|---|---|---|
| 3,373,437 | 3/1968 | Sweet et al. | 346/75 |
| 3,921,916 | 11/1975 | Bassovs | 346/75 X |
| 3,949,410 | 4/1976 | Bassovs et al. | 346/75 |
| 3,958,255 | 5/1976 | Chiou et al. | 346/75 X |
| 4,007,464 | 2/1977 | Bassovs et al. | 346/75 |

*Primary Examiner*—George H. Miller, Jr.

*Attorney, Agent, or Firm*—Biebel, French & Nauman

[57] ABSTRACT

A formed orifice plate for use in an ink jet printing device is provided in which the orifice plate and the side walls of the liquid reservoir formed above the orifice plate to supply ink to the orifices, are of unitary construction and formed from a thin sheet of material. The side walls are backed by a member in order to prevent propagation of spurious vibrations from the orifice plate along the side walls and into the liquid contained in the reservoir. An alternative construction of unitary orifice plate is also provided in which the orifice plate has a generally W-shaped cross section and provides two separate reservoirs with multiple rows of orifices.

19 Claims, 7 Drawing Figures

FORMED ORIFICE PLATE FOR INK JET PRINTING APPARATUS

BACKGROUND OF THE INVENTION

1. Field of the Invention

The present invention relates to ink jet printing devices, and more particularly, to a formed orifice plate for use in such devices.

2. Prior Art

Ink jet printing devices basically utilize a liquid reservoir for containing a printing ink and an orifice plate secured to the bottom of the reservoir with a plurality of very small diameter holes fabricated therein constituting orifices. The orifices are often disposed in a row, or a plurality of rows, along the length of a generally rectangular reservoir and orifice plate assembly. In order to control uniformity of drop generation from the plurality of orifices, which is important in order to obtain uniform printing, some means is provided for stimulating vibration of the orifice plate to cause motion of the liquid in a manner which induces pressure waves in the filaments extending from the orifices so that drops of uniform size and spacing are produced from each orifice. Some means is also provided in such devices for selectively catching drops coming from the orifices that are not to be used in printing on a printing medium.

The general construction of such devices is shown, for example, in Sweet et al. U.S. Pat. No. 3,373,437 and in Beam U.S. Pat. No. 3,577,198. There are many alternative constructions for such ink jet printing devices, but many utilize an orifice plate which is formed separately from the manifold forming the ink reservoir with some means being provided to secure the orifice plate and manifold together to prevent leaking.

The main difficulty associated with such constructions is in the various means utilized to secure the orifice plate to the manifold. It is very important to have a uniform contact along the length of the orifice plate between the upper surface of the orifice plate and the bottom contacting surface of the manifold. This is because spurious vibrations are otherwise induced in the liquid in the manifold and thus in the filaments generated from the orifices.

In order to accomplish the most uniform contact, it has been a common practice to either solder or epoxy the orifice plate to the bottom of the manifold. One drawback with epoxying the manifold is the nonuniformity in application of the epoxy which results in distortion of the orifice plate and a variation in the distance of separation between the orifice plate and the manifold. This variation in separation results in spurious vibrations being generated in the orifice plate and the liquid.

With regard to the use of solder, the most serious drawback associated with this technique of applying the orifice plate to the manifold is in the distortion caused by the necessity of heating the orifice plate and the manifold in order to cause adhesion with the solder. Since the orifice plate is relatively thin, it is easily warped when heated causing "row-bow". This phenomenon is merely the distortion of the plate in such a manner that the normally straight row of orifices becomes bowed laterally due to distortion in the plate during heating. This is undesirable since it changes the relative position of the orifices from their otherwise straight line location, causing difficulty with alignment with the charging mechanism and other control features of the ink jet printing device.

Both the use of epoxy and the use of solder to secure a flat orifice plate to the bottom of an ink supply manifold have the additional drawback that they cause contamination of the ink supply since at the joinder line between the orifice plate and the manifold the ink is in contact with either the epoxy or solder.

The device disclosed in the Sweet et al patent, mentioned above, is illustrated as having a slightly different construction which utilizes a unitary orifice plate and manifold construction of rectangular, channel-shaped cross section.

The disclosure of the patent suggests that either the wall containing the orifices or the opposite wall, may be vibrated to induce the proper uniformity in generation of filaments and drops from the orifices. However, it is apparent that spurious vibrations will likewise be induced by either vibrating technique since both the wall containing the orifices and the opposite wall are directly connected to the side walls. Vibrational waves will therefore be induced in the side walls since they are relatively thin, which will cause spurious vibrations in the liquid in contact therewith, thus affecting deletariously the uniformity of generation of filaments and drops from the orifices.

Another problem associated with such prior art devices is that the width of an orifice plate cannot be very wide since interfering vibration is induced widthwise of the orifice plate. The width is therefore generally limited to the wavelength of the first mode of vibration of the highest operating frequency. This then limits the number of rows of orifices which can be included in such an orifice plate because of the necessary spacing between rows required by associated hardware such as drop charging equipment.

SUMMARY OF THE INVENTION

The present invention overcomes the above described disadvantages and difficulties associated with the prior art devices by providing an orifice plate which is of unitary construction with the side walls forming the ink reservoir and which are backed by a member to eliminate spurious vibrations which otherwise affect the uniformity of filament and drop generation from the orifices. The orifice plate is formed with a generally U-shaped cross section and is made of a relatively thin sheet of material.

The bottom portion of the orifice plate is flat and contains the orifices uniformly spaced along its length. The sides are bent upwardly to form the side walls of the ink reservoir for supplying ink to the orifices with the upper most end portions of the side walls preferably being bent outwardly substantially parallel to the flat bottom portion containing the orifices and resting upon an orifice plate holder for providing means for clamping the orifice plate in the ink jet printing device.

In one alternative form, a damping material is disposed in engagement with the side walls of the orifice plate on the outside thereof opposite the surfaces forming the reservoir. The damping material fills a gap between the outside walls of the orifice plate and the corresponding adjacent walls of the orifice plate holder.

In another alternative form, the side walls of the orifice plate are positioned in surface-to-surface engagement with the orifice plate holder which itself acts as a vibration damping material. Additionally, the side walls of the orifice may be bonded by epoxy or the like, to the orifice plate holder.

These constructions have several advantages over the prior art in that they eliminate the so called "row-bow" mentioned above, caused by the high temperatures needed to solder conventional orifice plates to the bottom of the manifolds. Further, the problems of uniform bonding associated with the use of epoxy rather than solder to secure conventional orifice plates to the bottom of the manifold is eliminated since the joinder is now a bend in the unified construction of the orifice plate.

Also, in those embodiments of the orifice plate of the present invention which are not soldered or epoxied to the orifice plate holder, it can easily be removed by unbolting the orifice plate holder which secures the orifice plate to the manifold. Further, by the use of a member for damping vibrations on the outside of the walls of the orifice plate forming the reservoir, the difficulties associated with the inducement of spurious vibrations in these thin side walls when the orifice plate is vibrated, are eliminated.

An advantage of this orifice plate construction, particularly for use in a fluid coupled vibration system, is the ability to bend the side walls upwardly very close to the rows of orifices. This permits the width of the flat bottom portion of the orifice plate to be substantially less than the wavelength of the first mode of vibration at normal operating frequencies. This is advantageous in that it prevents higher modes of widthwise vibration from being generated in the orifice plate which would otherwise interfere with main wave propagation. With prior art orifice plate constructions, it has proven difficult to achieve this narrow width across the effective area of the orifice plate since the solder and epoxy are likely to enter the orifices when the plate is being secured in position. Also, in the case of soldering, the heat applied during assembly is much closer to the orifices thus increasing the undesirable effect of "row-bow".

In an alternative embodiment of the present invention, the unified orifice plate is given a generally W-shaped cross section so as to form two separate ink reservoirs. The bottom portion of each reservoir is provided with multiple rows of orifices and damping material is placed against all of the outside surfaces of the side walls including the side walls between the reservoirs. This construction has the added advantage of permitting a greater number of rows of orifices to be incorporated in an ink jet printing head than is otherwise conventionally possible since the critical width of the flat bottom portion of the orifice plate in each reservoir can be maintained at less than the width of the first mode of vibration at maximum operating frequency.

DETAILED DESCRIPTION OF THE PREFERRED EMBODIMENTS

The orifice plate and its related parts as illustrated in the present invention are intended for use in an ink jet printing device of the general type disclosed, for example, in Sweet et al. U.S. Pat. No. 3,373,437, and can be adapted very easily for use in the printing head construction disclosed, for example, in Houser U.S. Pat. No. 3,701,476. The basic principle of operation of the ink jet printing device as disclosed in these and other patents is well known in the prior art and will therefore not be discussed in detail herein. For such detail, reference should be made to the above mentioned patents and other related material in the prior art.

Figure 1:
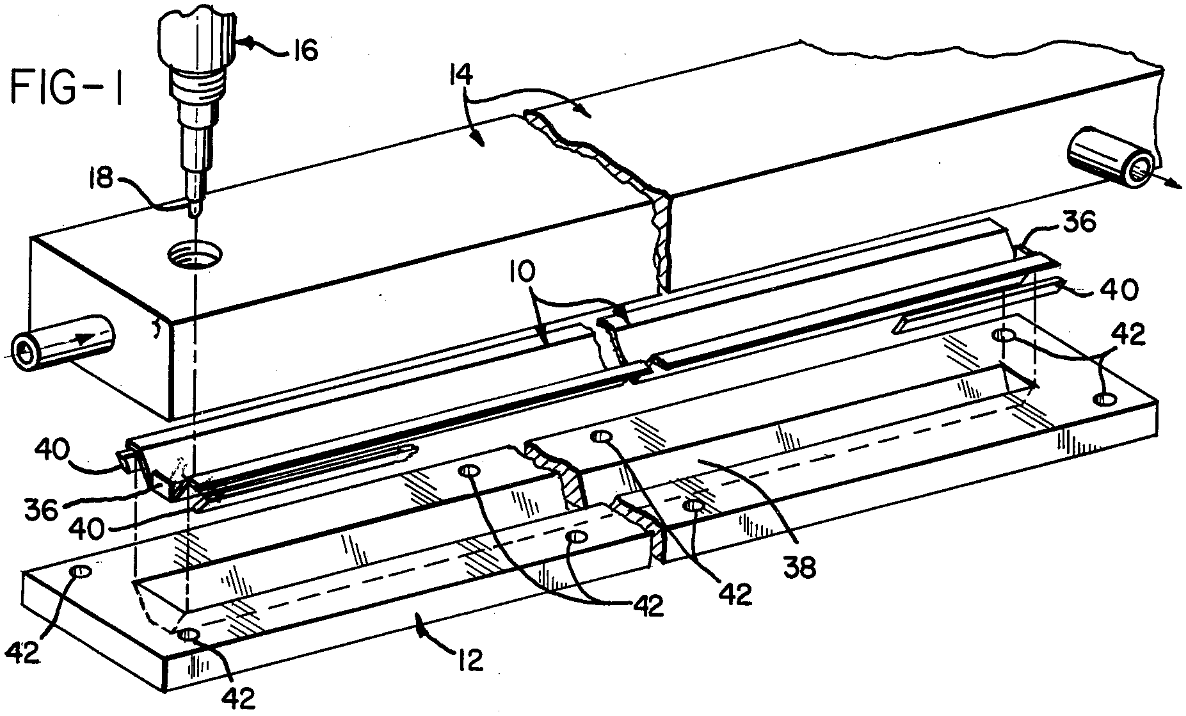
FIG. 1 is an expanded, broken, pictorial view of a preferred embodiment of the present invention illustrating an orifice plate, an orifice plate holder and an ink supply manifold.
Figure 2:
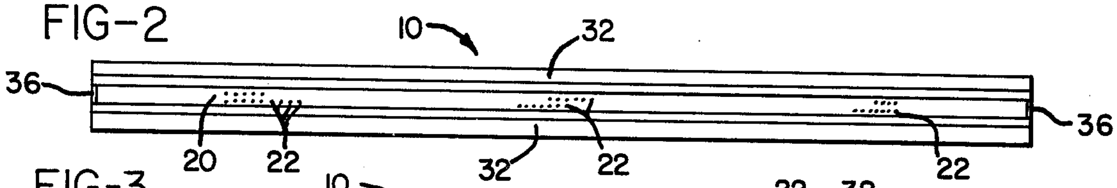
FIG. 2 is a top plan view of an embodiment of the orifice plate for the present invention with a substantially rectangular orifice containing flat bottom portion.
Figure 3:
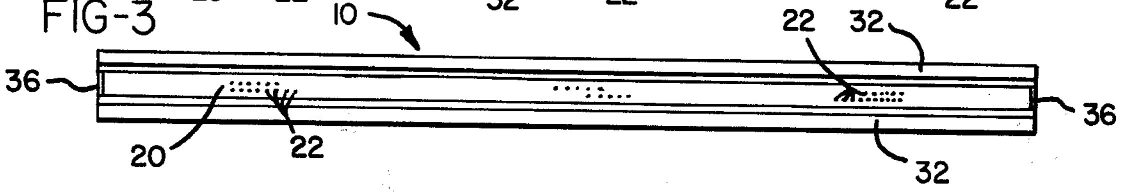
FIG. 3 is a top plan view of an alternative embodiment of the orifice plate of the present invention with the orifice containing flat bottom portion being tapered so as to narrow from left to right as illustrated.

With regard to the specific construction of the printing head of the present invention, with reference to FIG. 1, the orifice plate 10 is shown as being supported in an orifice plate holder 12 which is secured to the bottom of the ink supply manifold 14 through which is inserted a mechanical stimulation device 16 which vibrates orifice plate 10 at high frequency to produce the so called traveling wave vibrations along the length of the orifice plate. In a well known manner, the tip 18 of the stimulation device 16 engages the upper surface of the flat bottom portion 20 of orifice plate 10 to cause vibrational waves to move along the length of the orifice plate from the end engaged by the tip 18 to the end of the flat bottom portion of the orifice plate remote therefrom. As is well known in the art, the high frequency vibration of the orifice plate in this manner causes uniform generation of filaments and drops from the orifices 22 defined in rows in the bottom portion 20 of the orifice plate 10.

Figure 5:
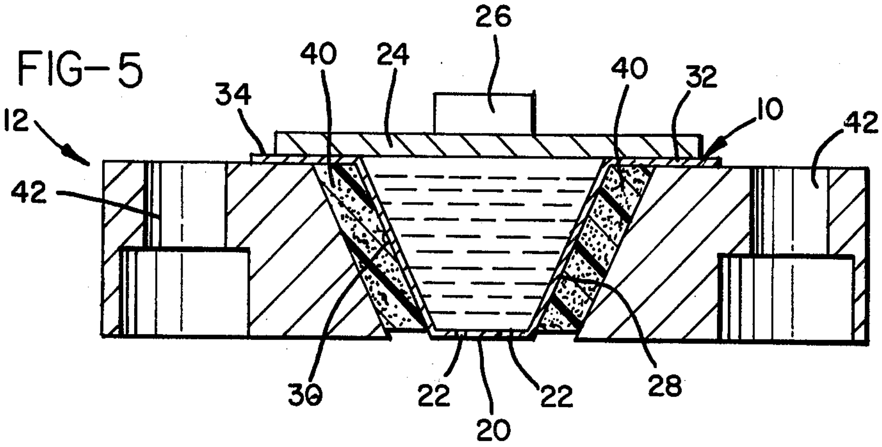
FIG. 5 is a cross section of an alternative embodiment from FIG. 4 in which a pressure plate and transducer assembly are used to apply pressure to the liquid in the reservoir in a fluid coupled construction of the present invention.

An alternative means of inducing uniform generation of filaments and droplets from the orifices 22 along the length of the orifice plate 10 is in the use of a so called fluid coupled technique which is illustrated by the alternative construction in FIG. 5. In this construction, for example, a thin pressure plate 24 is secured to the upper portion of the ink containing reservoir and is flexed downwardly by a transducer 26. Transducer 26 can be of any suitable type such as any form of electroacoustical transducer. This construction causes a series of high frequency pressure waves to travel through the liquid in the reservoir to the orifices 22 so as to cause uniform generation of filaments and droplets in a well known manner.

The construction of the orifice plate 10 does not vary significantly regardless of whether the traveling wave technique or the fluid coupled technique is utilized to stimulate the generation of uniform filaments and droplets from the orifices. It is possible, however, to have a thicker orifice plate in the case of fluid coupled stimulation since the orifice plate is not vibrated as it is in the case of traveling wave stimulation. In any event, the general construction of the orifice plate 10 is the same as illustrated by a comparison of FIGS. 4 and 5.

The orifice plate is preferably made from a thin metal such as 0.008 inch thick beryllium copper provided with a thin nickel plating, although other materials could be used. The cross sectional configuration of the orifice plate 10 is generally U-shaped with a flat bottom portion 20 containing the plurality of orifices 22 and upwardly depending side walls 28 and 30 which terminate in outwardly depending end portions 32 and 34 of side walls 28 and 30, respectively, which preferably extend substantially parallel to the bottom portion 20 in order to provide flat horizontal surfaces to secure the orifice plate 10 in position. The side walls 28 and 30 are preferably tapered outwardly from the vertical, although in some constructions it may be desirable to have side walls 28 and 30 extending substantially perpendicular to flat bottom portion 20.

The upper end portions 32 and 34 of side walls 28 and 30 rest on the upper surface of orifice plate holder 12 and are clamped thereto by securing the orifice plate and orifice plate holder to the bottom of ink manifold 14. Ink manifold 14 is utilized to supply ink to the ink reservoir formed by the orifice plate 10.

Each end of orifice plate 10 is provided with an upwardly turned tab 36 which is formed integral with the flat bottom portion 20 and bent upwardly to a substantially vertical position to form an end closure for the reservoir formed by the orifice plate. The tabs 36 are backed by the corresponding, mating end portions of the similarly shaped opening 38 in the orifice plate holder 12. A suitable sealing material can be inserted in the end portions of opening 38 between the outer surfaces of tabs 36 and the corresponding end surfaces of opening 38 in order to prevent leakage of ink from the reservoir.

Figure 4:
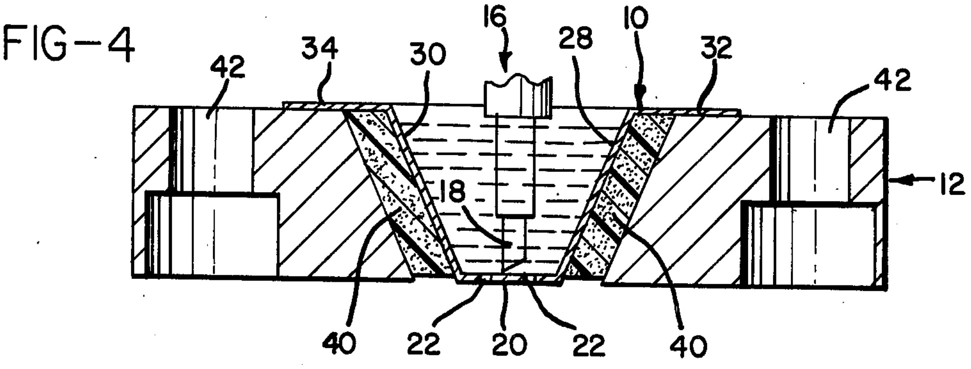
FIG. 4 is a cross sectional view of the embodiment of FIG. 1 in which a mechanical stimulator is used to induce traveling wave stimulation in the orifice plate.

The opening 38 defined in the orifice plate holder 12 corresponds in cross sectional shape to the cross sectional configuration of orifice plate 10, but is slightly wider than the orifice plate as seen in FIGS. 4 and 5. Thus, a gap is formed on each side of the orifice plate between the orifice plate and the orifice plate holder so that damping member 40 may be inserted between the outer surfaces of walls 28 and 30 and the corresponding surfaces of opening 38. The orifice plate holder is preferably made from relatively thick but soft metal such as 0.25 thick SAE 72 brass, although other materials would be suitable so long as they provide the necessary support, and for some embodiments described below, the necessary damping ability.

The damping member 40 extends the entire length of opening 38 on both sides of the orifice plate. It eliminates spurious vibrations which would otherwise propagate up the side walls from the bottom portion 20 of the orifice plate if it were not backed in some manner along the side walls when the orifice plate is vibrated as in the embodiment of FIG. 4, or when the liquid is vibrated as in the embodiment of FIG. 5.

The damping member 40 can be formed of any suitable material for damping vibrations in the side walls 28 and 30. For example, a curable polyurethane mixture which can be easily poured into the cavities and then allowed to harden, would be suitable. In order to form the damping member in this manner, the assembly is held in an inverted position from that illustrated in FIGS. 4 and 5. When the polyurethane cures it will form the damping members with tight surface-to-surface contact between the damping members, the outer walls of the orifice plate 10 and the corresponding walls of opening 38 in orifice plate holder 12.

It is to be understood, however, that the damping members 40 can be preformed and then placed in position when the orifice plate 10 is inserted in opening 38 and orifice plate holder 12. In any event, once the orifice plate and damping members are inserted in opening 38 in orifice plate 12, this assembly is then secured to the bottom of the ink supply manifold 14 such as by bolts inserted through holes 42 in the orifice plate holder 12 and corresponding threaded holes (not shown) in manifold 14. This assembly is then, in turn, secured in the ink jet printing device of the general type disclosed in the above referred to patents.

Figure 6:
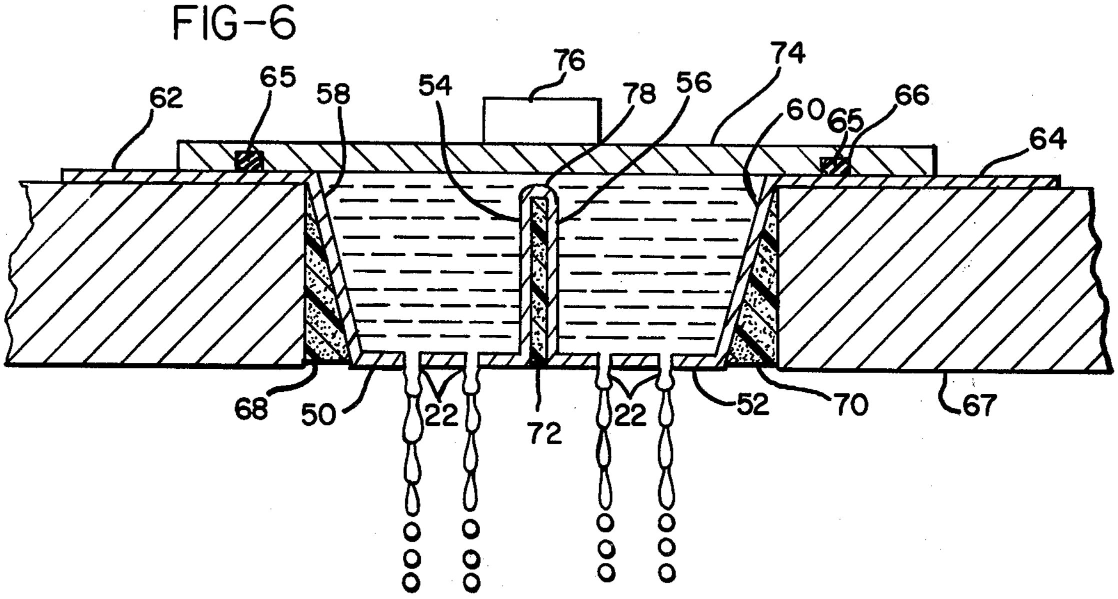
FIG. 6 is a cross sectional view of a further alternative embodiment of the present invention in which two ink reservoirs are provided which are formed from a single piece.

As regards the further alternative embodiment illustrated in FIG. 6, the construction and operation of the device are essentially the same with the exception that two ink reservoirs are defined in the orifice plate as opposed to the single reservoir in the embodiments as illustrated in FIGS. 4 and 5. The orifice plate, however, is formed in the same manner as described above for the single reservoir.

In this embodiment the orifice plate is formed with a generally W-shaped cross section with two sets of two rows of orifices 22 formed in the flat bottom portions 50 and 52 of the two reservoirs. The reservoirs are separated by inner walls 54 and 56 formed by folding a portion of the orifice plate in an inverted U-shaped configuration. The outer walls 58 and 60 of each reservoir are formed in the same manner as walls 28 and 30 of the previously described single reservoir embodiments and have their upper end portions 62 and 64 bent to extend substantially horizontally in order to hold the orifice plate in position in the same manner as with the previously described embodiments.

As O-ring 66 is included in this embodiment, which extends entirely around the orifice plate to assist in sealing against leakage of ink from the reservoir, particularly at the end portions thereof where there is no outwardly extending flange as there is along each side. The O-ring 66 is inserted in a recess 65 formed in the pressure plate described below. The O-ring 66 could also be used on the previously described embodiments as well.

As with the damping member 40 described in connection with the previous embodiments, the damping members 68 and 70 are preferably formed by inverting the assembly of the orifice plate and the orifice plate holder and then pouring liquid polyurethane into the gaps formed between the side walls of the orifice plate holder and the side walls 58 and 60 of the orifice plate. The material then cures and hardens to form the damping members 68 and 70.

In addition, damping material is also poured into the opening formed by the U-shaped construction of inner side walls 54 and 56. When this material hardens a resilient damping member 72 is formed which lends rigidity to the inner walls 54 and 56 as well as providing damping of spurious vibrations in these walls in the same manner described in connection with the previously described embodiments.

The advantage of this last described construction resides in the difficulty associated with making the width of flat bottom portions of the ink reservoir very wide. The wider this portion is the more likely that spurious vibrations will be induced in the flat bottom portion and extending up the side walls of the reservoir. By providing the additional inner walls 54 and 56, additional rows of orifices can be added without extending the effective width of the flat bottom portion. In effect, it is as though two entirely different chambers are formed rather than the single chamber and thus the width of each flat bottom portion of the two reservoirs is the controlling width rather than the overall width of the combined flat bottom portions.

Stimulation of uniform filament and droplet generation can be varied somewhat from the previously described embodiments. The embodiment illustrated in FIG. 6 shows the use of the fluid coupled technique of inducing vibration by using a pressure plate 74 which is flexed by an electroacoustical transducer 76. Since, in the embodiment illustrated, the top portion 78 of inner side walls 54 and 56 does not engage the bottom surface of pressure plate 74 the ink in the two reservoirs is in communication. Thus, the single pressure plate will induce the appropriate vibration of the ink in the two reservoirs to generate uniform filaments and droplets from the orifices. However, if the traveling wave technique is used, it will be necessary to separately induce vibration of each flat bottom portion 50 and 52 since the stimulation of one will not be communicated to the other because of damping material 72.

Figure 7:
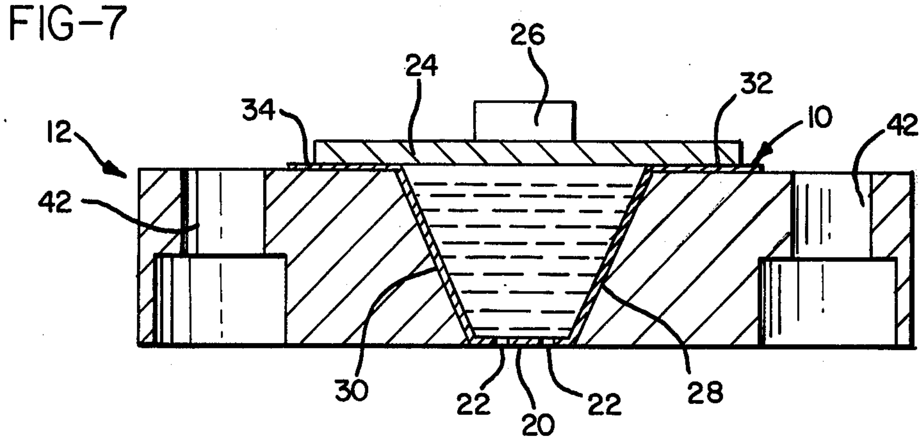
FIG. 7 is yet a further alternative embodiment of the present invention in which the outer side walls of the orifice plate are in direct engagement with the orifice plate holder.

Referring to yet a further alternative embodiment as illustrated in FIG. 7, the same numerals are used as in the embodiments illustrated in FIGS. 4 and 5 to designate the same members. The main distinction in this embodiment from that of FIGS. 4 and 5 is in the elimination of the damping members 40 from between the side walls 28 and 30 and adjacent wall portions of orifice plate holder 12.

Although use of the damping members 40 is preferred for damping of spurious vibrations in the side walls 28 and 30, it is believed that sufficient damping occurs in the embodiment of FIG. 7 to be effective. The side walls 28 and 30 in this embodiment are in surface-to-surface contact with the corresponding surfaces of orifice plate holder 12 which results in sufficient damping of vibration of the orifice plate side walls to permit generation of uniform filament length and droplet spacing, from the rows of orifices 22.

The same arrangement described above in connection with the embodiment of FIG. 7 can be used to modify the embodiment of FIG. 6. In other words, the damping members 68 and 70 can be removed and the configuration of the opening in orifice plate holder 63 can be modified to lie in surface-to-surface contact with the outer surfaces of outer walls 58 and 60. It is preferable, however, to leave the damping member 72 between the inner side walls 54 and 56 since spurious vibrations could migrate along these walls and interfere with main wave propagation.

It is also contemplated that, for example, in the embodiment of FIG. 7, the outer surfaces of side walls 28 and 30 can be epoxied or soldered to the corresponding inner side walls of the opening in the orifice plate holder 12. This can be used to inhance the damping characteristics at the interface if this should be necessary under certain operating conditions.

Referring again to the assembly as illustrated in FIG. 1, when it is operated ink will be supplied to the ink supply manifold 14 and will fill the reservoir formed in the orifice plate 10 by the upwardly depending side walls 28 and 30 and the end walls formed by tabs 36. Stimulation device 16 is then activated to cause high frequency (e.g. 50–100KH) vertical oscillation of the tip 18 which is in contact with the upper surface of the flat bottom portion 20 of the orifice plate 10. This will result in vibrational waves traveling length wise through the flat bottom portion 20 of the orifice plate. Also, since the side walls 28 and 30 are integrally formed with the flat bottom portion 20 of the orifice plate, some vibration will be induced in the side walls and extending longitudinally along the orifice plate in the same direction as the traveling waves.

However, since the side walls 28 and 30 are backed by damping members 40, the spurious vibrations induced in the side walls will be damped out relatively quickly and thus be prevented from causing interfering wave motions from being generated in the ink and also from reflecting back downwards along the side walls and inducing secondary vibrations in the flat bottom portion of the orifice plate.

This same damping effect also occurs in operation of the alternative construction as illustrated in FIG. 5. In this case it is normal to space the pressure plate 24 from the flat bottom portion 20 of the orifice plate, a distance such that the upper surface of flat bottom portion 20 will be positioned at a nodal point in the pressure wave distribution in the liquid so that no vibration will be induced in the orifice plate. However, as a practical matter, this is difficult to achieve exactly and some vibration will occur in the orifice plate. This will not be allowed to propagate through the orifice plate, however, since as soon as it reaches the upper side walls 28 and 30 it will be damped out by damping members 40, thus preventing serious interference with the operation of the device.

The further alternative constructions illustrated in FIGS. 6 and 7 operate in essentially the same manner as the two previously described embodiments except as noted above with regard to FIG. 6. Either means of stimulation described above can be used in these embodiments and the spurious vibrational waves induced in the side walls of the reservoirs will be damped out by the damping members in contact with these side walls.

While the form of apparatus herein described constitute a preferred embodiment of this invention, it is to be understood that the invention is not limited to this precise form of apparatus, and that changes may be made therein without departing from the scope of the invention.

What is claimed is:

1. An orifice plate assembly for use in an ink jet printing device or the like, comprising:

a thin plate forming a generally U-shaped cross section elongated member having a flat bottom portion with a plurality of orifices defined therein along its length and longitudinally extending upwardly depending side walls;

end closure means at each end of said elongated plate member for forming a liquid reservoir therein in association with said side walls and bottom portion; and vibration damping means disposed against outer surfaces of said side walls of said plate member for substantially preventing spurious vibrations from traveling through said side walls and from said side walls through liquid in said reservoir, to said bottom portion of said plate member.

2. An orifice plate assembly as defined in claim 1 wherein said vibration damping means includes an orifice plate holder having side walls in surface-to-surface contact with a substantial portion of the outside surface of said upwardly depending side walls of said thin plate.

3. An orifice plate assembly as defined in claim 1 wherein said vibration damping means includes vibration damping material disposed against said outer surfaces from a position adjacent said bottom portion of said plate members upwardly for a distance sufficient to substantially eliminate said spurious vibrations.

4. An orifice plate assembly as defined in claim 3 wherein said damping material extends along the entire upwardly depending side walls in contact therewith.

5. An orifice plate assembly as defined in claim 1 wherein uppermost end portions of said side walls remote from said bottom portion are disposed outwardly away from and substantially parallel to said bottom portion.

6. An orifice plate assembly as defined in claim 5 wherein said side walls of said plate member other than said end portions thereof are disposed outwardly at an obtuse angle from said bottom portion.

7. An orifice plate assembly as defined in claim 1 and further including:

rigid support means engaging said uppermost end portions of said side walls of said plate members for holding said plate member in position in said ink jet printing device; and means securing said plate member to said rigid support means.

8. An orifice plate assembly as defined in claim 7 wherein said bottom portion of said plate member is uniformly tapered along its length.

9. An orifice plate assembly as defined in claim 7 including means engaging said bottom portion of said plate member for causing traveling wave vibration thereof to induce substantially uniform filament and drop generation from said orifice.

10. An orifice plate assembly as defined in claim 7 including means remote from said bottom portion of said plate member and engaging said liquid in said reservoir for causing propagation of pressure waves through said liquid for inducing substantially uniform filament and drop generation from said orifices.

11. An orifice plate assembly for use in an ink jet printing device or the like, comprising:

a thin plate forming a member having at least two generally U-shaped cross section elongated substantially parallel channels each having flat bottom portions with a plurality of orifices defined therein along their lengths and longitudinally extending upwardly depending side walls of each;

end closure means at each end of each flat bottom portion for forming a liquid reservoir above each flat bottom portion in association with said upwardly depending side walls therefrom; and vibration damping means disposed against outer surfaces of said side walls for substantially preventing spurious vibrations from traveling through said side walls and from said side walls through liquid in said reservoir, to said bottom portion of said plate member.

12. An orifice plate assembly as defined in claim 11 wherein said vibration damping means includes vibration damping material disposed against said outer surfaces from a position adjacent said bottom portion of said plate members upwardly for a distance sufficient to substantially eliminate said spurious vibrations.

13. An orifice plate assembly as defined in claim 12 wherein said damping material extends along the entire upwardly depending side walls in contact therewith.

14. An orifice plate assembly as defined in claim 11 wherein upper most end portions of the two of said side walls forming outer most walls of said member, remote from said bottom portion are disposed outwardly away from and substantially parallel to said bottom portion.

15. An orifice plate assembly as defined in claim 14 wherein said side walls of said plate member other than said end portions of said two outer most side walls, are disposed outwardly at an obtuse angle from their associated said bottom portions.

16. An orifice plate assembly as defined in claim 15 and further including:

rigid support means engaging said upper most end portions of said side walls of said plate members for holding said plate member in position in said ink jet printing device; and means securing said plate member to said rigid support means.

17. An orifice plate assembly as defined in claim 16 wherein said bottom portions of said plate member are uniformly tapered along their length.

18. An orifice plate assembly as defined in claim 16 including means engaging said bottom portions of said plate members for causing traveling wave vibration thereof to induce substantially uniform filament and drop generation from said orifices.

19. An orifice plate assembly as defined in claim 16 including means remote from said bottom portions of said plate member and engaging said liquid in said reservoir for causing propagation of pressure waves through said liquid for inducing substantially uniform filament and drop generation from said orifices.

* * * * *